Dec. 14, 1954   E. R. SKLAR   2,696,719
FLEXIBLE COUPLING
Filed Sept. 30, 1949
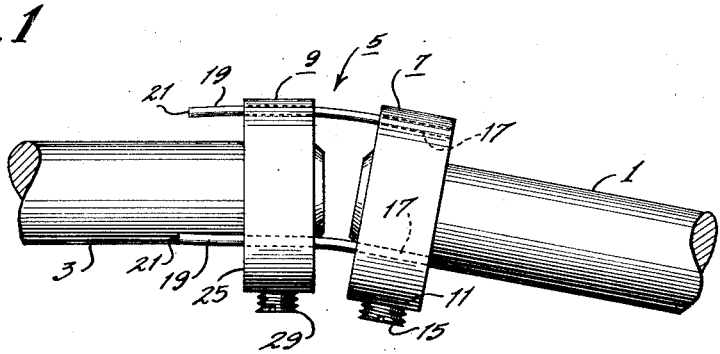
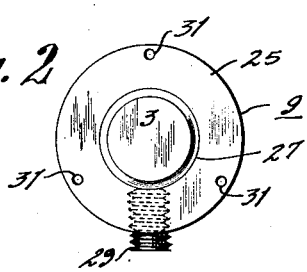
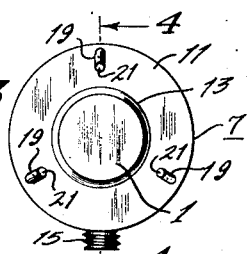
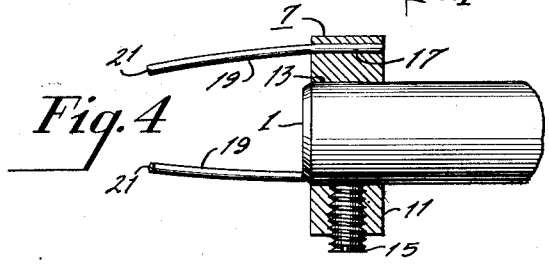
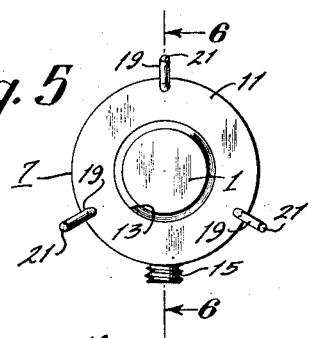
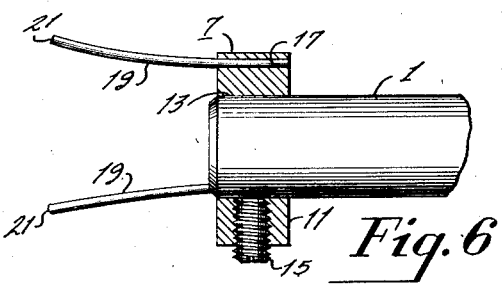
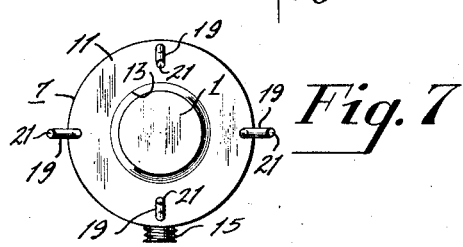
Inventor
E. Robert Sklar
By Morris D. Rabkin
Attorney

United States Patent Office 2,696,719
Patented Dec. 14, 1954

2,696,719

FLEXIBLE COUPLING

Ezra Robert Sklar, Camden, N. J., assignor, by mesne assignments, to the United States of America as represented by the Secretary of the Navy Application September 30, 1949, Serial No. 118,945

4 Claims. (Cl. 64—15)

My present invention relates to flexible couplings for transmitting torque between driving and driven elements whether in or out of true alignment.

In certain types of servo-control mechanisms designed to meet specific requirements wherein a driven shaft is caused to be rotated by a drive shaft, it is necessary, for efficient and proper operation of the mechanism, to cause the driven shaft to rotate with a minimum of torsional displacement or back lash with respect to the drive shaft. It would be desirable to provide a rigid coupling between the driving and driven shafts to satisfy this requirement, but mechanical assembly will not always permit this arrangement. For example, in some cases, the axis of the one shaft might be offset with respect to the axis of the other shaft, or the axis of the one shaft might be at an angle with respect to the axis of the other shaft. Other cases require an arrangement which will permit axial movement of the driving and driven shafts toward or away from each other, and still other cases might include a combination of these several conditions.

The primary object of my present invention, therefore, is to provide a flexible coupling for connecting driving and driven elements which shall transmit driving torque between the elements with a minimum of torsional displacement or back lash.

Still another object of my present invention is to provide a flexible coupling which shall transmit driving torque from a driving shaft to a driven shaft and yet allow for any misalignment of the two shafts.

A further object of my present invention is to provide a flexible coupling for driving and driven shaft members which shall automatically adjust itself to any movement of the shafts axially toward or away from each other during operation of the mechanism.

It is also an object of my present invention to provide a flexible coupling for use with certain types of servo-control mechanism which shall transmit driving torque between driving and driven elements with a high degree of efficiency.

Another object of my present invention is to provide a flexible coupling for connecting driving and driven members which employs but a few parts, and one which is simple and easy to construct at a minimum of cost.

In accordance with my present invention, I provide a flexible coupling for transmitting torque between driving and driven shafts which comprises a pair of complementary coupling members each having a collar element provided with a central aperture for mounting the coupling members on their respective shafts, means being provided for adjusting and securing the coupling members to their respective shafts. A plurality of resilient, elongated coupling pins or rod-like members are mounted on one of the coupling member collars and extend therefrom in the same direction, being disposed substantially equi-angularly about the axis of the collar and being permanently biased or loaded to be flared somewhat in relation to the collar axis. The collar of the other complementary coupling member is provided with a plurality of apertures for slidably receiving the resilient coupling pins. The purpose in permanently biasing or loading the resilient pins as above described, either toward or away from the axis of their associated collar central aperture, is to urge them into engagement with the walls of the resilient coupling pin receiving apertures and to minimize any torsional displacement of the shafts with respect to each other.

The novel features characteristic of my invention, as well as additional objects and advantages thereof, will be better understood from the following detailed description when read in connection with the accompanying drawing in which:

Figure 1 is a side elevation of a flexible coupling in accordance with one embodiment of my present invention, shown connecting the ends of two shafts the axes of which are disposed at an angle to one another;

Figure 2 is an end view of the left hand coupling member of Figure 1, which member is provided with coupling pin receiving apertures;

Figure 3 is an end view of the right hand coupling member of Figure 1, this coupling member being provided with resilient coupling pins which are biased to flare inwardly;

Figure 4 is a sectional view taken on the line 4—4 of Figure 3;

Figure 5 is an end view similar to Figure 3 of a modified form of coupling member having resilient coupling pins which are biased to flare outwardly;

Figure 6 is a sectional view taken on the line 6—6 of Figure 5, and

Figure 7 is an end view similar to Figures 3 and 5 of still another form of coupling member, this coupling member being provided with resilient coupling pins arranged in pairs, one pair of resilient coupling pins being loaded toward the central aperture axis, and the other pair of resilient coupling pins being loaded away from the central aperture axis.

Referring more particularly to the drawing, wherein similar reference characters designate corresponding parts throughout, there is shown in Figure 1, two shafts 1, 3 of a mechanical assembly. For the purpose of illustration, the shaft 1 is designated herein as the drive shaft and the shaft 3 is designated herein as the driven shaft. The flexible coupling 5, according to one form of my present invention, comprises a pair of complementary coupling members 7, 9 which connect the driving shaft 1 with the driven shaft 3 for transmitting driving torque from one to the other.

The coupling member 7 comprises a collar 11 having a central aperture 13 for receiving the shaft 1, the aperture 13 having substantially the same diameter as the diameter of the shaft 1. The collar 11 is drilled radially and threaded to receive a set screw 15 therein for the purpose of securing the coupling member 7 to the shaft 1, as well as to permit adjustment of this coupling member's position on the shaft 1. A plurality of resilient coupling pins or rod-like members 19 are mounted on the collar 11, each one having an end 17 thereof secured by suitable means to the collar 11, with their free ends 21 extending in the same direction. The pin members 19 are biased to converge or flare inwardly toward the axis of the aperture 13 in a direction away from the collar 11 and are disposed equi-angularly about the axis of the collar 11. Accordingly, when the coupling member 7 is secured to its shaft 1, the resilient coupling pin members 9 will also be equi-angularly disposed about the shaft axis.

The other and complementary coupling member 9 comprises a collar 25 which is similar to the collar 11, comprises a central aperture 27 for receiving the shaft 3, the aperture 27 having substantially the same diameter as the diameter of the shaft 3. A set screw 29 is also provided in the collar 25 for securing the coupling member 9 to the shaft 3, the set screw 29 being disposed and functioning in the same manner as the set screw 15. The collar member 25 is provided with coupling pin receiving apertures 31 which extend through the collar member 25 in spaced, substantially parallel relation to the axis of the central aperture 27. The coupling pin receiving apertures 31 are of a diameter sufficient to slidably receive the coupling pin members 19.

When assembled, the complementary coupling members 7, 9 are adjusted in position on their respective shafts so that they are spaced apart an amount sufficient to allow for any movement of the shafts axially toward or away from each other, as well as to permit flexure and slidable movement of the coupling pin members 19 in the coupling pin receiving apertures 31 thereby to provide for any misalignment of the two shafts.

In operation, any torsional displacement or back lash of either shaft with respect to the other is held to a minimum because the resilient coupling pins 19 are constantly biased into contact with the walls of the coupling pin receiving apertures irrespective of the misalignment of the two shafts. In the event there is any tendency of the shafts to move axially with respect to each other, the forces which otherwise would tend to prevent this movement are dissipated by the sliding movement of the coupling pins 19 in the apertures 31. Thus, the forces resulting from the bias stored in the normally bent rod members act to establish a common or parallel axis for the two rotating shafts so that the two shafts effectively rotate as if they were rigidly connected and disposed on a common axis. Under normal operating conditions, it is desirable to have the complimentary coupling members 7, 9 disposed on the shafts 1, 3 in closely spaced relation thereby to obtain a more rigid coupling for minimizing back lash. However, should the two shafts be considerably misaligned, loading between the shafts and their respective bearings would be increased if the closely spaced relation of the complementary coupling members is maintained. In this event, the adjustable feature of the complementary coupling members will permit repositioning of the members on their respective shafts so that they may be spaced apart a greater distance, thereby extending the effective length of the coupling pin members and increasing the flexibility of the coupling with the result that excess loading is avoided on the shaft bearings.

While the primary purpose of loading or biasing the coupling pin members 19 is to minimize torsional displacement or back lash between the two shafts 1, 3, it serves a secondary purpose in that any wear which is caused by friction between the coupling pin receiving apertures 31 and the coupling pins 19 is taken up so as not to adversely affect the operation of the device over long periods of continued use.

In Figures 1 through 4 of the drawing, the coupling pin members 19 are shown loaded or biased toward the axis of the central aperture 13. However, the coupling pin members 19 may also be loaded away from the axis of the central aperture, as shown by the embodiment illustrated in Figures 5 and 6 of the drawing. In the event it is found desirable to employ an even number of coupling pin members 19, as illustrated by the modification shown in Figure 7 of the drawing, the coupling pin members are arranged to provide duplicate pairs of coupling pin members, with the respective members of each pair disposed diametrically opposite to one another on opposite sides of the collar central aperture. In the event two pairs are provided, one pair can be loaded away from the collar axis and the other pair loaded toward the collar axis, as shown in Figure 7. In all cases, however, it is essential to proper and efficient operation of the flexible coupling that the biasing forces of the coupling pin members be distributed equally about the shaft axis in order to maintain a uniform transfer of driving torque.

From the foregoing, it will be obvious to those persons skilled in the art that I have provided a simple, flexible coupling for efficiently transmitting driving torque between driving and driven shaft members with torsional displacement or back lash held to a minimum, a factor which is of considerable importance to certain servo-control devices.

While I have described and illustrated three embodiments of my present invention, it will also be recognized that various changes and modifications are possible within the spirit of my invention. Therefore, I desire that the particular forms of my invention described herein shall be considered as illustrative and not as limiting.

What is claimed is:

1. A flexible coupling for connecting driving and driven shafts in torque transfer relation, said coupling comprising a pair of complementary coupling members, means for releasably securing said members each to a separate one of said shafts, one of said complementary coupling members comprising a rigid collar having a central aperture for receiving one of said shafts, said central aperture having substantially the same diameter as the shaft thereby providing for adjustment of said collar along said shaft, a plurality of resilient rod-like members secured at one of the ends thereof to said collar, said rod-like members being disposed substantially equi-angularly about the axis of said central aperture, the other of said complementary coupling members comprising a rigid collar having a central aperture for receiving the other of said shafts, said last mentioned central aperture having substantially the same diameter as the other of said shafts thereby providing for adjustment of said last mentioned collar along said last mentioned shaft, said last mentioned collar being provided with apertures for receiving said resilient rod-like members, the free ends of said resilient rod-like members being slidable within and extending through said member-receiving apertures, said resilient rod-like members being biased in radial directions with respect to said first mentioned axis thereby to engage the walls of said member-receiving apertures and providing the sole means for transferring torque between said collars on said shafts.

2. The invention as set forth in claim 1 wherein said resilient rod-like members are biased toward the axis of said first mentioned collar central aperture.

3. The invention as set forth in claim 1 wherein said resilient rod-like members are biased away from the axis of said first mentioned collar central aperture.

4. The invention as set forth in claim 1 wherein said resilient rod-like members are arranged in pairs, the resilient rod-like members of each pair being disposed diametrically opposite to one another, and wherein certain ones of said pairs are biased away from said first mentioned collar central aperture axis, and certain others of said pairs are biased toward said first mentioned collar central aperture axis.

References Cited in the file of this patent

UNITED STATES PATENTS

| Number | Name | Date |
| --- | --- | --- |
| 1,185,208 | Lapp | May 30, 1916 |
| 1,395,289 | O'Leary | Nov. 1, 1921 |
| 2,439,479 | Mackmann | Apr. 13, 1948 |

FOREIGN PATENTS

| Number | Country | Date |
| --- | --- | --- |
| 389,907 | Great Britain | Mar. 30, 1933 |
| 398,074 | Great Britain | Sept. 7, 1933 |
| 439,966 | Great Britain | Dec. 18, 1935 |